Figure 3:
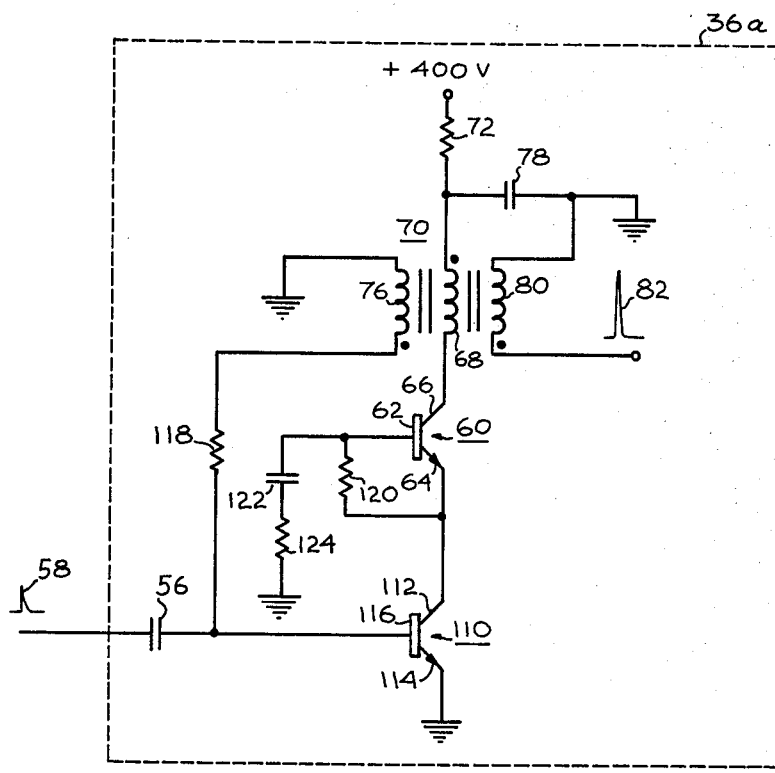

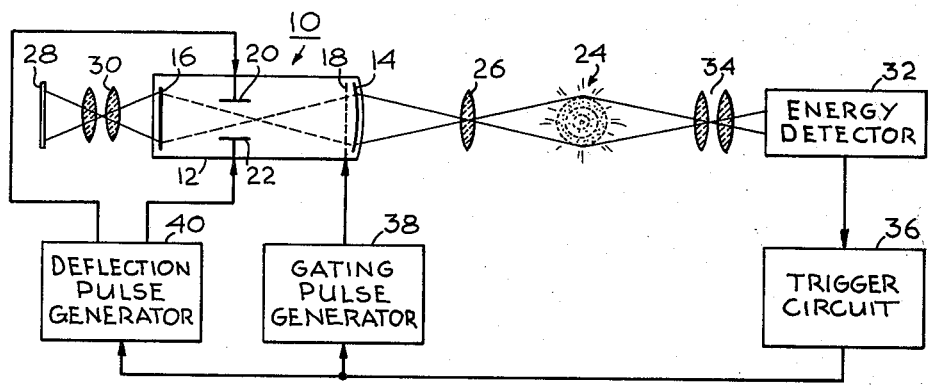
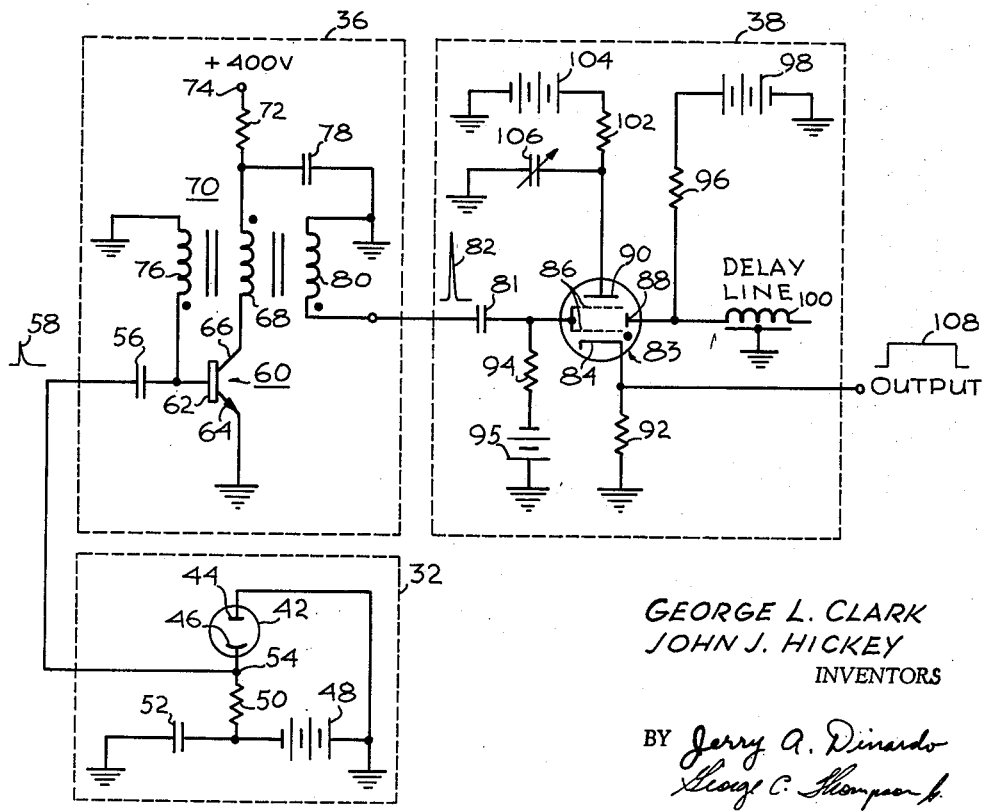

United States Patent Office 3,151,268
Patented Sept. 29, 1964

3,151,268
HIGH SPEED AUTOMATIC TRIGGERING APPARATUS FOR AN ELECTRONIC CAMERA
George L. Clark and John J. Hickey, Hawthorne, Calif., assignors to Space Technology Laboratories, Inc., Los Angeles, Calif., a corporation of Delaware
Filed Nov. 30, 1961, Ser. No. 156,105
9 Claims. (Cl. 315—10)

This invention relates to high speed photographic apparatus, and particularly to apparatus for taking pictures of ultra high speed phenomena without losing any appreciable part of the phenomena.

An electronic camera of the image converter type has recently been developed which permits the recording of luminous transient events occurring in the millimicrosecond range, such as events encountered in plasma physics, chemical kinetics, and hypervelocity experiments. With exposure times of less than 3 nanoseconds and a light gain of 50, such a camera is capable of obtaining data which was previously unobtainable.

In applications where the time of occurrence of a given event is known or can be controlled, it is a relatively simple matter to synchronize the actuation of the camera with the occurrence of the event under study. However, in instances where the time of occurrence of the event can not be precisely predetermined, it is necessary to provide some means for recording the event in the shortest possible time after it starts, so that no appreciable part of the event is lost.

Accordingly, an object of this invention is the provision of apparatus for photographing high speed transient events without losing any appreciable part of the event.

Another object is the provision of means for automatically triggering an electronic camera within a very short time after the start of the high speed event being photographed.

The foregoing and other objects are realized in an electronic camera apparatus which utilizes energy associated with the event itself being photographed to actuate the camera. According to the invention, energy of one form or another, that is associated with the phenomenon either by cause or effect is picked up by a suitable detector which generates an electrical signal in response to the energy detected. In plasma physics studies, for example, the energy detected may be the light emitted by the plasma when it is subjected to electromagnetic energy, or it may be the electromagnetic energy to which the plasma is subjected. The electrical signal is fed to a trigger circuit to produce a triggering pulse of a magnitude sufficient to drive a gating pulse generator. The gating pulse generator produces a high voltage, low impedance rectangular gating pulse. The output of the gating pulse generator is fed to the grid of an image converter camera tube for controlling the operation of the latter. The voltage control circuit comprising the detector, the trigger circuit, and the gating pulse generator are designed as a unit to achieve automatic actuation times of less than 40 nanoseconds between the beginning of the event being studied and the taking of the picture.

In the drawing:

FIG. 1 is a block diagram of an electronic camera system according to the invention, FIG. 2 is a schematic diagram showing portions of the camera system in more detail, FIG. 3 is a schematic diagram showing an improved trigger circuit which forms a part of the electronic camera system according to the invention.

Referring now to the drawings in which like numerals refer to similar parts, FIG. 1 is a block diagram of an electronic camera system according to the invention. The electronic camera system includes as one of its principal components an image converter tube 10 which functions primarily as a high speed shutter. Another function of the image converter tube 10 is that of providing light amplification for the extremely short frame times involved in its high speed photographic operation.

The image converter tube 10 comprises essentially a cylindrical evacuated envelope 12 containing a photoemissive cathode or photocathode 14 at one end, a fluorescent screen 16 at the other end, a control grid 18 adjacent to the photocathode 14, and a pair of deflection plates 20 and 22 intermediate the control grid 18 and the fluorescent screen 16. Certain other parts and components essential to the operation of the tube 10 are omitted for simplicity, since these are well known. For example, the tube 10 ordinarily contains additional electrodes such as an anode and focusing electrodes and also requires a high voltage supply. It will suffice to say that the tube may be one of the kind manufactured by RCA and bearing the developmental type number C 73435A.

In the operation of the electronic camera for the purpose of photographing high speed transient phenomena, light from an object 24 is focused by a lens 26 onto the photocathode 14 of the image converter tube 10. The electron image emitted from the photocathode 14 is normally prevented from reaching the fluorescent screen 16 by the application of a sufficiently high negative blanking voltage to the control grid 18 relative to the photocathode 14.

In operation, a rapid series of frames or exposures of the phenomenon or object 24 can be taken by applying a series of positive rectangular gating voltage pulses to the control grid 18. The gating voltage pulses are sufficiently large, such as 300 volts, to unblank the grid 18 and permit the electron image to be accelerated towards the fluorescent screen 16. The different frames or exposures may be reproduced side-by-side on the fluorescent screen 16 by applying deflection voltages to the deflection plates 20 and 22 respectively, between and during successive gating pulses. The amplified light images appearing on the fluorescent screen 16 are then projected onto a photographic film 28 by means of a lens system 30. In practice, the film 28 may be part of a camera of the type which allows rapid development of the exposed film 28.

Instances may arise when it is desired to photograph a high speed transient event, the exact time of occurrence of which is not determinable. For example, in studying the light emission from a laser it may not be known when the laser first begins to emit after the pumping light is applied. Similarly, in the study of plasma physics, there may be a variable delay between the closing of a switch, to start a train of events which leads to the application of electromagnetic energy to a plasma, and the emission of light from the plasma.

In accordance with one embodiment of the invention, a gating signal for actuating the image converter tube 10 is developed in a circuit which includes an electromagnetic energy detector 32 exposed through a lens system 34 to the phenomenon or object 24 to be recorded. The beginning of the event for example, may be manifested by the initial emission of light from the object 24. In such case, the detector 32 may comprise a phototube circuit. Alternatively, the energy used for detection may be a magnetic field, a voltage, a current, a pressure wave, or some other form of energy associated with the phenomenon under study, in which case a detector sensitive to the particular form of energy may be used in conjunction with an appropriate means of coupling the energy to the detector. For example, a piezoelectric crystal may be employed to detect a pressure wave.

Assuming that light energy is to be detected, the light emission is picked up by the detector 32 or phototube circuit where it is converted into an electrical impulse. The electrical impulse is fed to a trigger circuit 36 to develop an amplified trigger pulse of sufficient magnitude to drive a gating pulse generator 38 and a deflection pulse generator 40 which generate the desired gating and deflection pulses for operating the image converter tube 10.

Since the event under scrutiny itself is used to actuate the image converter tube 10, it will be seen that the time delay developed in the control circuit including the detector 32, the trigger circuit 36, and the gating pulse generator 38, must be kept as short as possible so as not to lose an appreciable part of the event. In accordance with the invention, the control circuit is designed to actuate the image converter tube 10 within a period of 40 nanoseconds.

FIG. 2 shows in more detail a schematic arrangement of the control circuit. In the embodiment shown, the detector 32 is one that is responsive to light radiation and is therefore illustrated as consisting of a phototube circuit. The detector 32 includes a phototube 42 having its anode 44 grounded and its cathode 46 connected to a negative voltage source 48 through a load resistor 50. For a type 917 phototube, the source 48 voltage may typically be 1000 volts. A decoupling capacitor 52 is connected between ground and the high voltage end of the load resistor 50.

In the absence of radiation on the phototube 42 no current flows in the circuit, and the entire voltage will appear across the phototube 42. The junction point 54 between the load resistor 50 and the phototube 42 is thus at a high negative potential. When light strikes the phototube 42, upon the initiation of the event to be recorded, a current proportional to the light flux flows in the phototube 42 causing a voltage drop across the load resistor 50. The potential at the junction point 54 thereupon rises in voltage, that is, it becomes less negative than what it was formerly. The rise in voltage at the junction point 54 appears as a positive voltage pulse 58 which is fed through a coupling capacitor 56 to the trigger circuit 36.

The trigger circuit 36 comprises a blocking oscillator utilizing a transistor 60 operating in the avalanche mode. The positive voltage pulse 58 is fed to the base 62 of the transistor 60. The transistor 60 shown is of the NPN type and may comprise a type 2N1342. However, a PNP transistor will provide equally good results.

The transistor 60 has an emitter 64 which is grounded. The collector 66 is connected in series with the primary winding 68 of a pulse transformer 70, and a resistor 72 to the positive terminal 74 of a direct current voltage supply, which in this case is 400 volts. A first secondary winding 76 of the transformer 70 is connected between ground and the base 62 of the transistor 60. An energy storage device or capacitor 78 is connected between ground and the junction of the primary winding 68 and the resistor 72. Another secondary or output winding 80 has one end grounded and the other end coupled to the input of the gating pulse generator 38 through a coupling capacitor 81.

In operation, the capacitor 78 is initially charged to the supply voltage. When the positive input voltage pulse 58 from the detector 32 exceeds some value of low voltage, say 1.5 volts, the base 62 to emitter 64 junction conducts, supplying charge carriers to the collector 66 to base 62 junction. Since the collector circuit including capacitor 78 and transformer primary winding 68, has low impedance, the current rises rapidly from the collector 66 to the base 62. The voltage drop caused by this current flowing through the base 62 forward biases the emitter 64 to base 62 junction, and the multiplication of carriers in an "avalanche" forms a direct low impedance path from the collector 66 to the emitter 64, through which the capacitor 78 can discharge in series with the primary winding 68. As the capacitor 78 begins to discharge, the rising current flowing in the primary winding 68 induces a voltage in the first secondary winding 76 which is regeneratively coupled to the base 62 to drive the transistor 60 rapidly to saturation. The current in the primary winding 68 induces a voltage in the output winding 80 that is almost double the initial collector 66 voltage. The polarity of the output winding 80 is such as to produce a positive output trigger pulse 82. The speed of response of the trigger circuit 36 is such that the output trigger pulse 82 is produced within 20 nanoseconds after application of the electrical impulse from the detector 32.

The output trigger pulse 82 of the trigger circuit 36 is fed through the coupling capacitor 81 to the gating pulse generator 38. The gating pulse generator 38 comprises a thyratron switching tube 83 which is preferably a tetrode, such as a type 2D21. The switching tube 83 includes a cathode 84, a control electrode 86, a primary anode 88 surrounded by the control electrode 86, and a secondary anode 90 spaced from the control electrode 86. As depicted herein, the switching tube 83 is connected and operated in a nonconventional manner. For example, the control electrode 86, or the electrode which triggers the tube 83 into conduction, usually functions as a shield electrode in conventional circuits, and the primary anode 88 usually is used to trigger the tube 83 into conduction. As will become apparent, certain advantages result from the novel operation of the switching tube 83.

A cathode load resistor 92 is connected between the cathode 84 and ground. The control electrode 86 is normally biased to a negative potential by connection through a grid bias resistor 94 to a voltage source 95. The bias on the control electrode 86 is in excess of the cutoff bias of the switching tube 83. The control electrode 86 receives the trigger pulse 82 from the trigger circuit 36 through the coupling capacitor 81, the trigger circuit 36 providing a voltage pulse of sufficient magnitude to overcome the bias on the control electrode 86 and thereby cause the tube 83 to switch into a conducting condition.

The primary anode 88 is maintained at a moderately high positive potential by connection through a first isolating resistor 96 to a primary anode voltage source 98. A delay line 100 is also connected between the primary anode 88 and ground, and forms one discharge circuit.

The secondary anode 90 is maintained at a relatively high positive potential by connection through a second isolating resistor 102 to a secondary anode voltage source 104. A trimmer capacitor 106 is connected between the secondary anode 90 and ground, and forms another discharge circuit. Typical operating potentials for the tube 83 are realized when the bias voltage source 95 is −75 volts, the primary anode voltage source 98 is +800 volts, and the secondary anode voltage source 104 is +1500 volts.

The operation of the gating pulse generator 38 will now be described. In the absence of a positive trigger pulse 82 on the control electrode 86 from the trigger circuit 36, the switching tube 83 is biased to a nonconducting condition. As a result, the trimmer capacitor 106 is charged to the full voltage of the secondary anode voltage source 104, and the delay line 100 is charged to the full voltage of the primary anode voltage source 98.

To generate a rectangular high voltage, low impedance gating pulse 108, the tube 83 is rendered conducting by applying the positive trigger pulse 82 from the output of the trigger circuit 36, to the control electrode 86. The capacitor 106 quickly discharges through the tube 83 to produce a rapid rise in the gating pulse 108. While the secondary anode 90 remains at a higher positive potential than the primary anode 88, some of the discharge current flows into the primary anode 88 circuit in a sense to add further charge to the delay line 100. This charging current appears as a brief negative current pulse or wave that travels along the length of the delay line 100.

Shortly after the initiation of the traveling negative current wave, the potential of the secondary anode 90 drops below that of the primary anode 88, because current flowing through the tube 83 discharges the capacitor 106. When this occurs, the delay line 100 discharges through the primary anode 88–cathode 84 circuit of the tube 83, thereby reversing the direction of current flow in the delay line 100 and sending a positive going traveling current wave down the delay line 100. Both current waves are reflected out of phase at the end of the delay line 100, and are now sent back to the primary anode 88 as a brief positive pulse followed by a negative pulse.

During its discharge, the delay 100 delivers a constant amplitude current to the load resistance 92, which appears as the main portion of the rectangular gating pulse 108. The gating pulse 108 terminates when both waves reach the primary anode 88, with the brief positive current wave reaching the primary anode 88 slightly ahead of the negative current wave and serving to square up the trailing edge of the gating pulse 108.

According to one operative embodiment, the following circuit values were used:

| | |
|---|---|
| Capacitor 56 | .001 microfarad. |
| Capacitor 78 | .001 microfarad. |
| Resistor 72 | 600 kilohms. |
| Resistor 92 | 50 ohms. |
| Resistor 102 | 10 megohms. |
| Capacitor 106 | 4–30 micromicrofarads. |
| Resistor 96 | 10 megohms. |
| Source 98 | 800 volts. |
| Source 104 | 1500 volts. |
| Capacitor 81 | 100 micromicrofarads. |
| Resistor 94 | 10 kilohms. |
| Source 95 | −75 volts. |
| Delay line 100 | 2 feet of RG–58/U cable. |
| Transistor 60 | 2N1342. |
| Tube 83 | Type 2D21. |
| Phototube 42 | Type 917. |
| Resistor 50 | 100 kilohms. |
| Capacitor 52 | .01 microfarad. |
| Source 48 | 1000 volts. |

The transformer 70 was a pulse transformer manufactured by Pulse Engineering, Inc. of Santa Clara, California, bearing the code No. 3075, in which the turns ratio between the primary winding 68, the secondary winding 76, and the output winding 80, were 2:1:4, respectively.

Rectangular gating pulses of 350 volts in magnitude were generated having rise and decay times less than 3 nanoseconds and duration typically of 10 nanoseconds. By using the foregoing trigger circuit and gating pulse generator in conjunction with a type 917 phototube for studying laser emissions, the image converter tube was triggered within 40 nanoseconds after the laser first started to emit light.

FIG. 3 shows an improved form of trigger circuit 36a in which the speed of response is such as to produce an output trigger pulse 82 within 10 nanoseconds after the reception of the input pulse 58 from the detector 32. The improved trigger circuit 36a reduces the total actuation time to within 30 nanoseconds. In addition, the improved circuit is capable of being triggered by a ½ volt input pulse 58 as compared with a 1½ volt pulse required for the circuit of FIG. 2. The trigger circuit 36a is similar to the trigger circuit 36 of FIG. 2 except that an additional transistor 110 is inserted in series with the emitter 64 of the transistor 60. The collector 112 of the transistor 110 is connected to the emitter 64 of the transistor 60. The emitter 114 is grounded. The base 116 is connected through a current limiting resistor 118 to the secondary winding 76, and is directly connected to the coupling capacitor 56. A resistor 120 connected between the base 62 and the emitter 64 of the transistor 60 provides a low D.C. resistance between those elements 62 and 64, as is customarily employed in avalanche transistor circuitry. A series capacitor 122 and resistor 124 is connected between the base 62 of the transistor 60 and ground.

In operation, the positive input voltage pulse 58 which is fed through the coupling capacitor 56 is of sufficient amplitude to cause the transistor 110 to avalanche. The resulting voltage drop of the collector 112 which is directly tied to the emitter 64 of the transistor 60 causes the voltage between the emitter 64 and the base 62 of the transistor 60 to exceed that voltage level which is required for avalanching. The transistor 60 thereupon avalanches and is driven towards saturation. During this action, the base 62 is held at a positive voltage by the capacitor 122 in series with the resistor 124, the latter serving to limit the current in the base 62 to emitter 64 circuit. It will be noted that in this embodiment, the regenerative feedback from the secondary winding 76 is used to saturate the transistor 110, which in turn hastens the saturation of the transistor 60.

In addition to the circuit values given in connection with FIG. 2, the following components were used for the circuit of FIG. 3:

| | |
|---|---|
| Transistor 110 | Type 2N706. |
| Capacitor 122 | .001 microfarad. |
| Resistor 124 | 51 ohms. |
| Resistor 120 | 51 ohms. |
| Resistor 118 | 51 ohms. |

The embodiments of the invention in which an exclusive property or privilege is claimed are defined as follows:

1. Apparatus for automatically actuating an electronic camera tube by means of energy derived from an object to which said camera tube is exposed for recording purposes, comprising: an energy detector for receiving energy from said object and converting it to an electrical impulse, a trigger circuit coupled to the output of said detector for deriving an amplified trigger pulse from said electrical impulse, said trigger circuit including a blocking oscillator circuit utilizing a transistor arranged to operate in an avalanche mode, means coupled to the output of said trigger circuit for generating a gating pulse from said trigger pulse, and means for feeding said gating pulse to said camera tube to alter the potential between a control grid and the photocathode thereof.

2. Apparatus for automatically actuating an electronic camera tube by means of energy derived from an object to which said camera tube is exposed for recording purposes, comprising: an energy detector for receiving energy from said object and converting it to an electrical impulse; a trigger circuit coupled to the output of said detector for deriving an amplified trigger pulse from said electrical impulse, said trigger circuit including a transistor having a base to which said electrical impulse is fed, a grounded emitter, and a collector, a pulse transformer including a primary winding connected in series with said collector, a secondary winding connected regeneratively to said base, and an output winding across which said amplified trigger pulse is developed; means coupled to said output winding for generating a gating pulse from said trigger pulse, and means for feeding said gating pulse to said camera tube to alter the potential between a control grid and the photocathode thereof.

3. Apparatus for automatically actuating an electronic camera tube by means of energy derived from an object to which said camera tube is exposed for recording purposes, comprising: an energy detector for receiving energy from said object and converting it to an electrical impulse; a trigger circuit coupled to the output of said detector for deriving an amplified trigger pulse from said electrical impulse, said trigger circuit including a transistor having a base to which said electrical impulse is fed, a grounded emitter, and a collector, a pulse transformer including a primary winding connected in series with said collector, a secondary winding connected regeneratively to said base, and an output winding across which said amplified trigger pulse is developed; a gating pulse generator coupled to said output winding, said gating pulse generator including a thyratron tube having a cathode, a control electrode for receiving said trigger pulse, a primary anode, and a secondary anode, an energy storage device connected to said secondary anode, a delay line connected to said primary anode, and a load resistor connected to said cathode and across which said gating pulse is developed; and means for feeding said gating pulse to said camera tube to alter the potential between a control grid and the photocathode thereof.

4. Apparatus for automatically actuating an electronic camera tube by means of energy derived from an object to which said camera tube is exposed for recording purposes, comprising: an energy detector for receiving energy from said object and converting it to an electrical impulse; a trigger circuit coupled to the output of said detector for deriving an amplified trigger pulse from said electrical impulse, said trigger circuit including a blocking oscillator circuit utilizing two transistors connected in cascade, with each transistor arranged to operate in an avalanche mode; means coupled to the output of said trigger circuit for generating a gating pulse from said trigger pulse; and means for feeding said gating pulse to said camera tube to alter the potential between a control grid and the photocathode thereof.

5. Apparatus for automatically actuating an electronic camera tube by means of energy derived from an object to which said camera tube is exposed for recording purposes, comprising: an energy detector for receiving energy from said object and converting it to an electrical impulse; a trigger circuit coupled to the output of said detector for deriving an amplified trigger pulse from said electrical impulse, said trigger circuit including a first transistor having a base to which said electrical impulse is fed, a grounded emitter, and a collector, a second transistor connected in series with the collector of said first transistor, a pulse transformer including a primary winding connected in series with the collector of said second transistor, a secondary winding connected regeneratively to the base of said first transistor, and an output winding across which said amplified trigger pulse is developed; means coupled to said output winding for generating a gating pulse from said trigger pulse; and means for feeding said gating pulse to said camera tube to alter the potential between a control grid and the photocathode thereof.

6. Apparatus for automatically actuating an electronic camera tube by means of energy derived from an object to which said camera tube is exposed for recording purposes, comprising:
an energy detector for receiving energy from said object and converting it to an electrical impulse;
a trigger circuit coupled to the output of said detector for deriving an amplified trigger pulse from said electrical impulse, said trigger circuit including first and second transistors connected in cascade, said first transistor having an input circuit for receiving an input trigger pulse, a pulse transformer including a primary winding connected in the output circuit of said second transistor, a secondary winding regeneratively coupled to the input circuit of said first transistor and an output winding across which an amplified trigger pulse is developed, and a capacitor connected between said primary winding and ground;
means coupled to the output of said trigger circuit for generating a gating pulse from said trigger pulse;
and means for feeding said gating pulse to said camera tube to alter the potential between a control grid and the photocathode thereof.

7. Apparatus for automatically actuating an electronic camera tube by means of energy derived from an object to which said camera tube is exposed for recording purposes, comprising:
an energy detector for receiving energy from said object and converting it to an electrical impulse;
a trigger circuit coupled to the output of said detector for deriving an amplified trigger pulse from said electrical impulse, said trigger circuit including a first transistor having a base for receiving an input trigger pulse, a grounded emitter and a collector, a second transistor including a base, an emitter connected to the collector of said first transistor and a collector, a pulse transformer including a primary winding connected to the collector of said second transistor, a secondary winding regeneratively connected to the base of said first transistor and an output winding for developing an amplified trigger pulse thereacross, and a capacitor connected between said primary winding and ground;
means coupled to the output of said trigger circuit for generating a gating pulse from said trigger pulse;
and means for feeding said gating pulse to said camera tube to alter the potential between a control grid and the photocathode thereof.

8. The invention according to claim 7, wherein said trigger circuit further includes a resistor connected between the base and emitter of said second transistor, and a resistor and capacitor in series between the base of said second transistor and ground.

9. The invention according to claim 7, wherein said trigger circuit further includes a source of positive potential connected through a resistor in series with said capacitor.

References Cited in the file of this patent
UNITED STATES PATENTS

| | | |
|---|---|---|
| 2,859,377 | Clemens | Nov. 4, 1958 |
| 2,871,400 | Buntenback | Jan. 27, 1959 |
| 2,927,215 | Allen et al. | Mar. 1, 1960 |
| 2,999,172 | Lawrence | Sept. 5, 1961 |
| 3,069,563 | Fuss | Dec. 18, 1962 |